United States Patent
Abrams et al.

(10) Patent No.: US 6,675,350 B1
(45) Date of Patent: Jan. 6, 2004

(54) SYSTEM FOR COLLECTING AND DISPLAYING SUMMARY INFORMATION FROM DISPARATE SOURCES

(75) Inventors: Steven R. Abrams, New City, NY (US); David H. Jameson, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/433,872

(22) Filed: Nov. 4, 1999

(51) Int. Cl.[7] ......................... G06F 17/21; G06F 17/30
(52) U.S. Cl. .................. 715/501.1; 715/500.1; 715/513; 705/75; 705/21; 707/3; 707/4; 707/104.1; 717/143; 717/165
(58) Field of Search ..................... 707/501.1, 513; 715/501.1, 513, 500.1; 705/75

(56) References Cited

U.S. PATENT DOCUMENTS

| | | | |
|---|---|---|---|
| 6,141,007 A | * | 10/2000 | Lebling et al. ............. 345/792 |
| 6,199,077 B1 | * | 3/2001 | Inala et al. ............... 715/501.1 |
| 6,202,062 B1 | * | 3/2001 | Cameron et al. ............... 707/3 |
| 6,389,472 B1 | * | 5/2002 | Hughes et al. ............... 709/229 |
| 6,405,192 B1 | * | 6/2002 | Brown et al. ................... 707/3 |
| 6,421,694 B1 | * | 7/2002 | Nawaz et al. ................ 715/526 |

OTHER PUBLICATIONS

Tracey Stanley, Intelligent Searching Agents on the Web, Jan. 23, 1997, pp. 1–4.*

* cited by examiner

Primary Examiner—Joseph H. Feild
Assistant Examiner—Matthew Ludwig
(74) Attorney, Agent, or Firm—Whitman, Curtis & Christofferson, P.C.; Stephen C. Kaufman

(57) ABSTRACT

A system is described for collecting and displaying summary information from disparate sources. The system provides for user customization of data acquisition parameters for locating articles to be summarized, user customization of parameters for parsing the located source material so as to extract headlines, and user organization of extracted headlines into groups.

30 Claims, 8 Drawing Sheets

FIG.5

SYSTEM FOR COLLECTING AND DISPLAYING SUMMARY INFORMATION FROM DISPARATE SOURCES

BACKGROUND OF THE INVENTION

1. Field of the Invention

The present invention generally relates to systems for automatically searching and filtering information, and in particular to systems for collecting and presenting summary information from a variety of sources on the Internet.

2. Background Description

A great many data sources are currently available on computer networks such as the Internet. For example, many newspapers, radio stations, magazines, and even news reporting services have available web sites with lots of information. However, it is not currently convenient for a user to quickly browse the contents of more than one of these information sources at a time. For one thing, web browsers only show one site in a window at a time. Even if multiple windows are open, the sites take up lots of screen real estate, are all laid out differently, and have a good deal of extraneous information on them, such as advertisements. Also, different software programs utilizing different protocols may be needed to access this information: some of the desired data may be stored in a WWW site (requiring HTTP and an HTML parser to access it), while other data may be stored in a usenet discussion group (requiring the NNTP protocol for access). It is therefore desirable to have a tool which can collect and display summary information from disparate sources, particularly one that can do so in a consistent and compact manner, regardless of source and layout of the original data.

Two specific types of systems attempt to achieve similar advantages. Systems such as the "My Yahoo" ticker are able to display personalized information to the user. However, the user is restricted to sources provided by the Yahoo WWW portal. The Pointcast model is another example of a similar solution. Microsoft Active Desktop supports the notion of an information channel. This requires a provider to make information available in Microsoft's specified protocols and data formats.

SUMMARY OF THE INVENTION

It is therefore an object of the present invention to provide a tool which can collect and display summary information (e.g. headlines) from disparate sources in a consistent and compact manner, regardless of the source and layout of the original data.

Another object of the invention is to be able to pull information from different sources without a central provider acting as a portal.

It is also an object of the invention to be able to pull information from a source without requiring providers to massage their information into a special protocol or data format.

A further object of the invention is to leave control of site selection completely in the hands of the user.

Yet another object of the invention is to provide means for accessing the full text of a source from a summary.

In accordance with the invention, a user selects an arbitrary number of sites from which summaries are to be drawn. These sites may be accessible through a variety of protocols, and for each protocol there is a set of data acquisition procedures which will take the information and put it in a common format for further processing. Lookup parameters are used to determine the protocol applicable to a given site, so that the appropriate data acquisition procedures may be applied. The raw information acquired from each site is then pre-processed to return a set of URL/information pairs.

The invention then allows the user to configure constraints which further filter this information, the results of which are then immediately displayed to the user. The results are evaluated by the user, and the foregoing sequence is repeated by the user until summary information which the user finds appropriate for the site is displayed. Multiple sites may be evaluated together in this process, so that the user may configure a particular set of constraints to be effective for multiple sites.

After completion of this configuration process for the sites selected by the user, the filtered information can be organized and presented to the user in a number of different ways, such as a multi-line horizontally scrolling ticker or as a collection of tabbed views. Although a typical site may generate a plurality of URL/information pairs, there is no necessary connection between how these pairs are grouped by site or by set of constraints in the summarization process, on the one hand, and how the information is organized for display.

The invention allows the user to remove and add sites to those selected, and to repeat the process for different groups of sites, enabling the user to adaptively construct multiple sets of configuration constraints, each appropriate for a particular site or group of sites, and organize and combine the summary results into a composite display useful for the particular purposes of the user.

BRIEF DESCRIPTION OF THE DRAWINGS

The foregoing and other objects, aspects and advantages will be better understood from the following detailed description of a preferred embodiment of the invention with reference to the drawings, in which:

Figure 5:
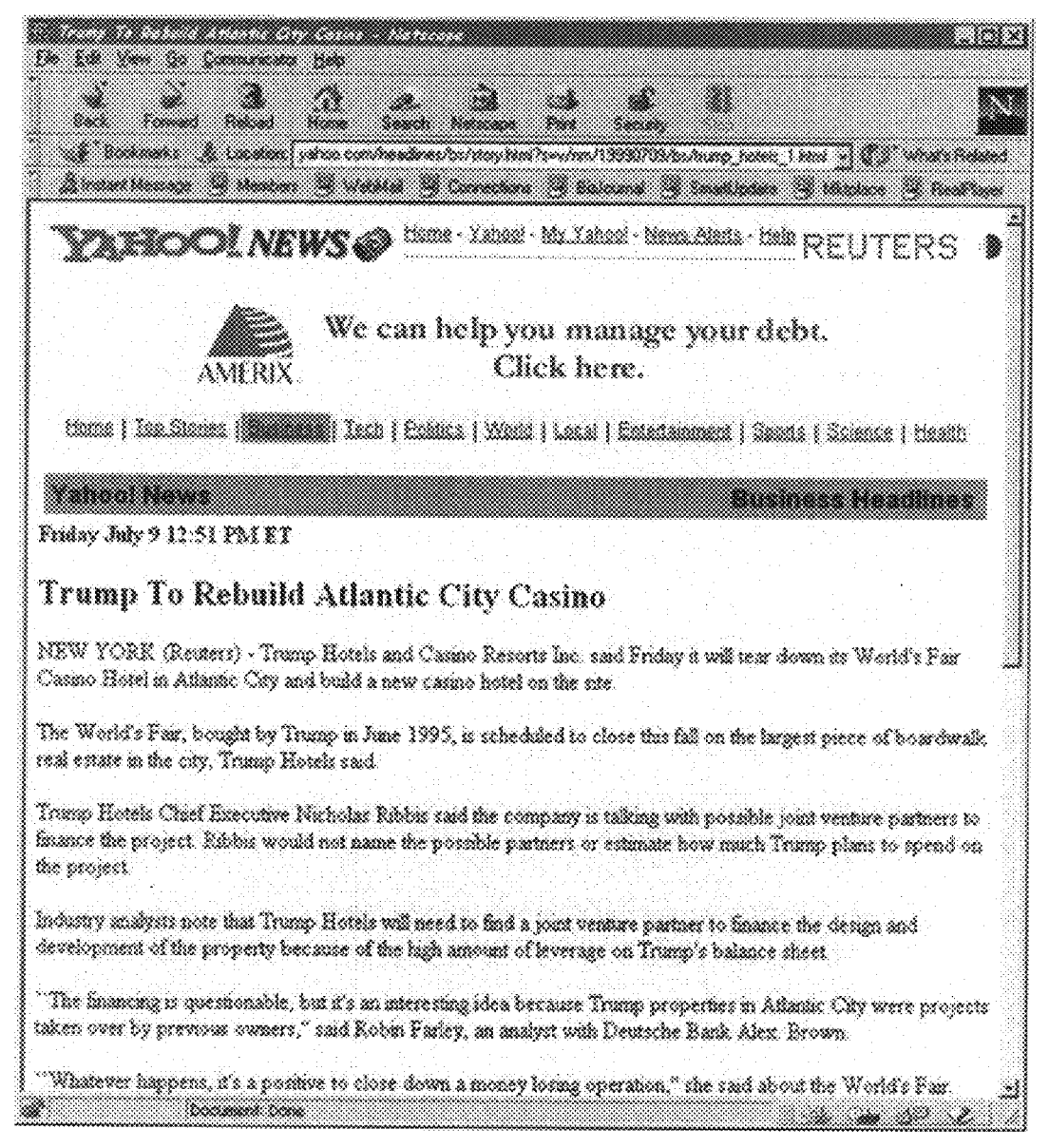

FIG. 5 shows a page from a web site containing a story that could be acquired and summarized using the invention.

DETAILED DESCRIPTION OF A PREFERRED EMBODIMENT OF THE INVENTION

Figure 3:
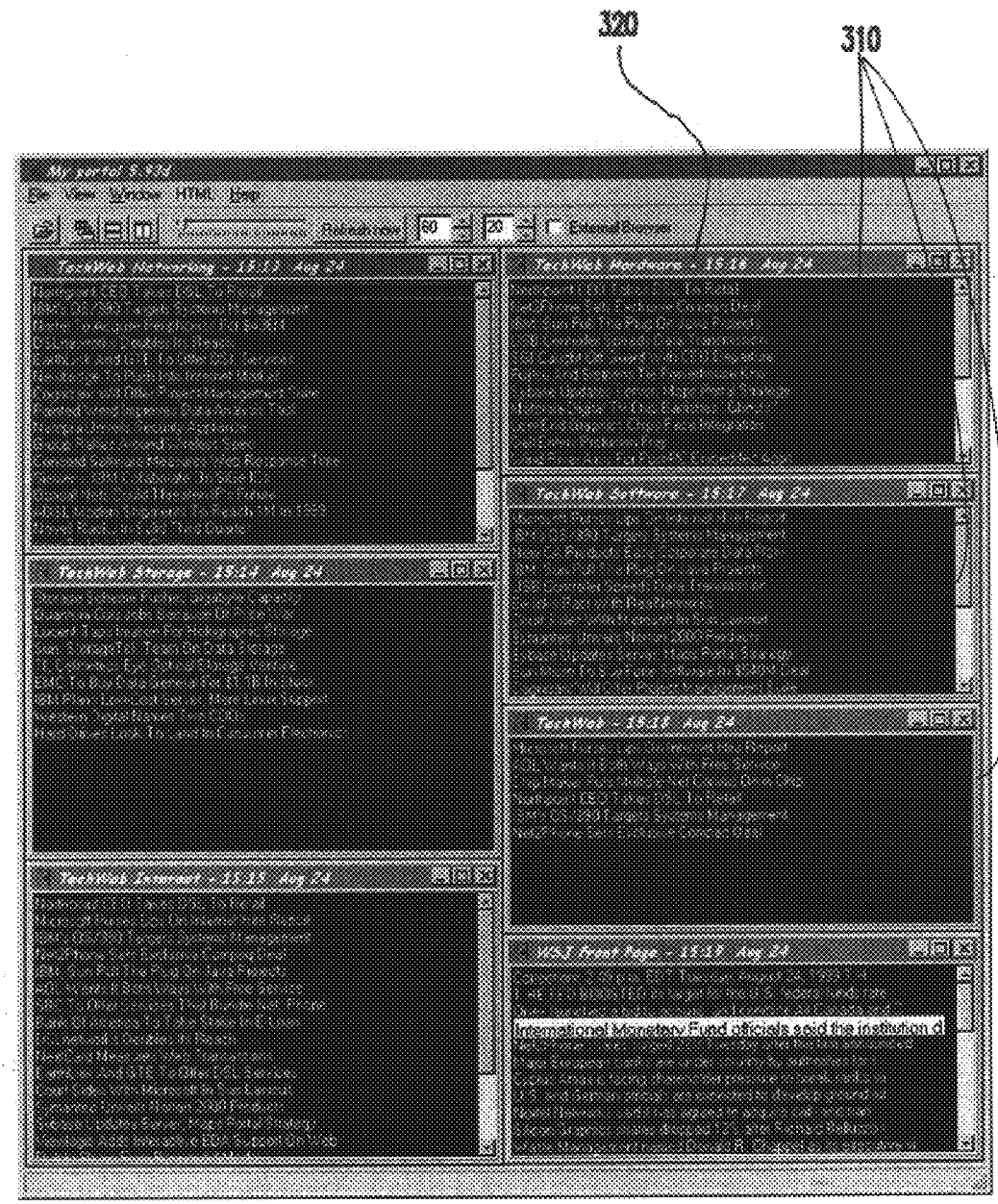
FIG. 3 is a "MyPortal" display of data summarized and organized using the invention.
Figure 6:
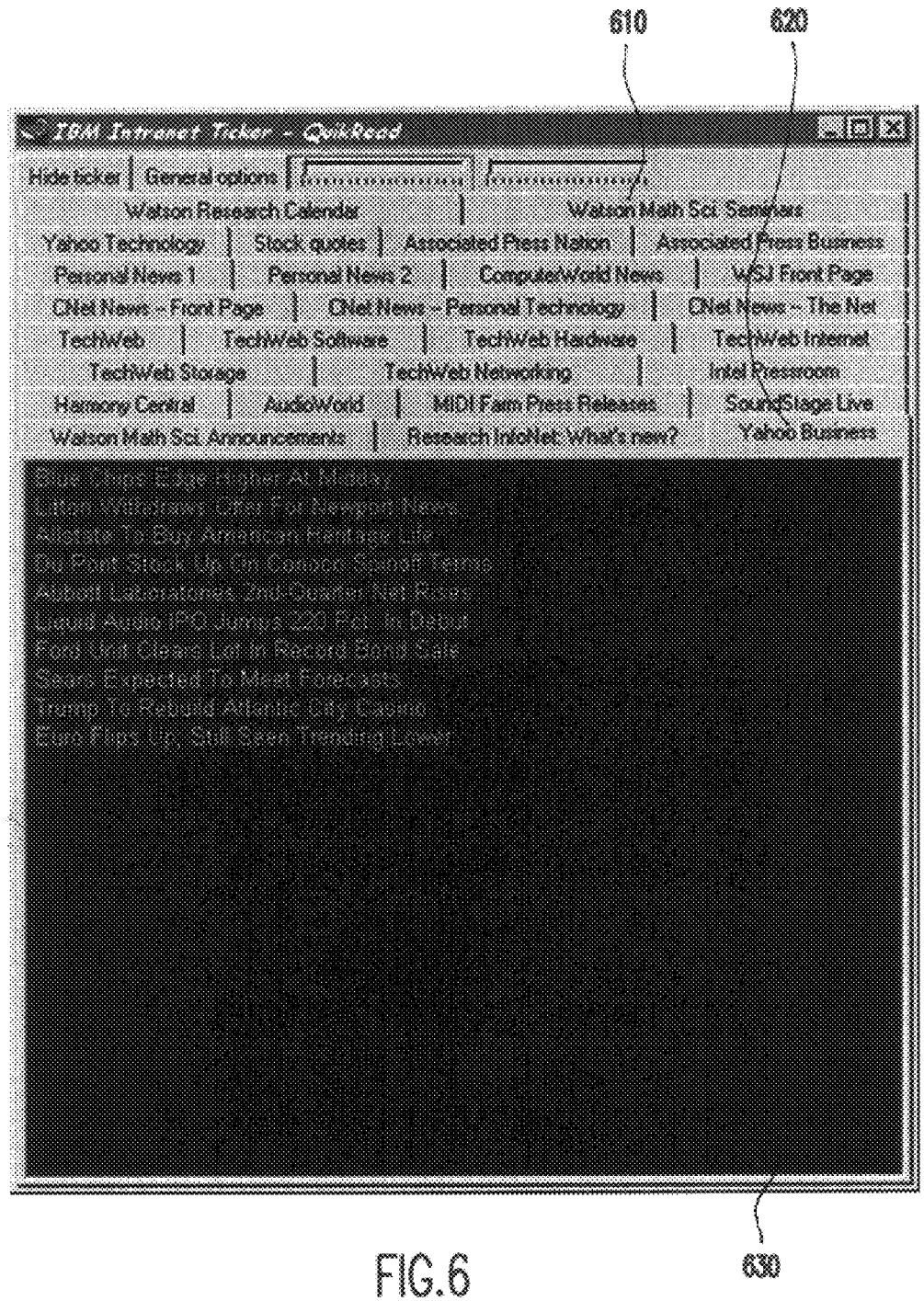
FIG. 6 shows a tabbed display of data summarized and organized using the invention, with a list of summaries from a single tab.
Figure 7:
FIG. 7 shows a page from a ticker presenting headline summaries extracted using the invention.

The invention provides means for collecting summary information from remote sources, associating each summary item (e.g. a reference item contained in a remote source web page) with a network address (i.e. a Universal Resource Locator or URL) which describes where the full data item can be found. The invention also provides means for displaying summary information in a number of display formats. These display formats include a scrolling display 40 (a ticker, as shown in FIG. 7), a static display 45 (a tab-view, as shown in FIG. 6) and a view 50 that appears like a single web-site (the MyPortal view, as shown in FIG. 3). There is also a means for launching an appropriate viewer for displaying the full version of the information summarized, e.g. the full-text of an article behind a headline.

Figure 1:
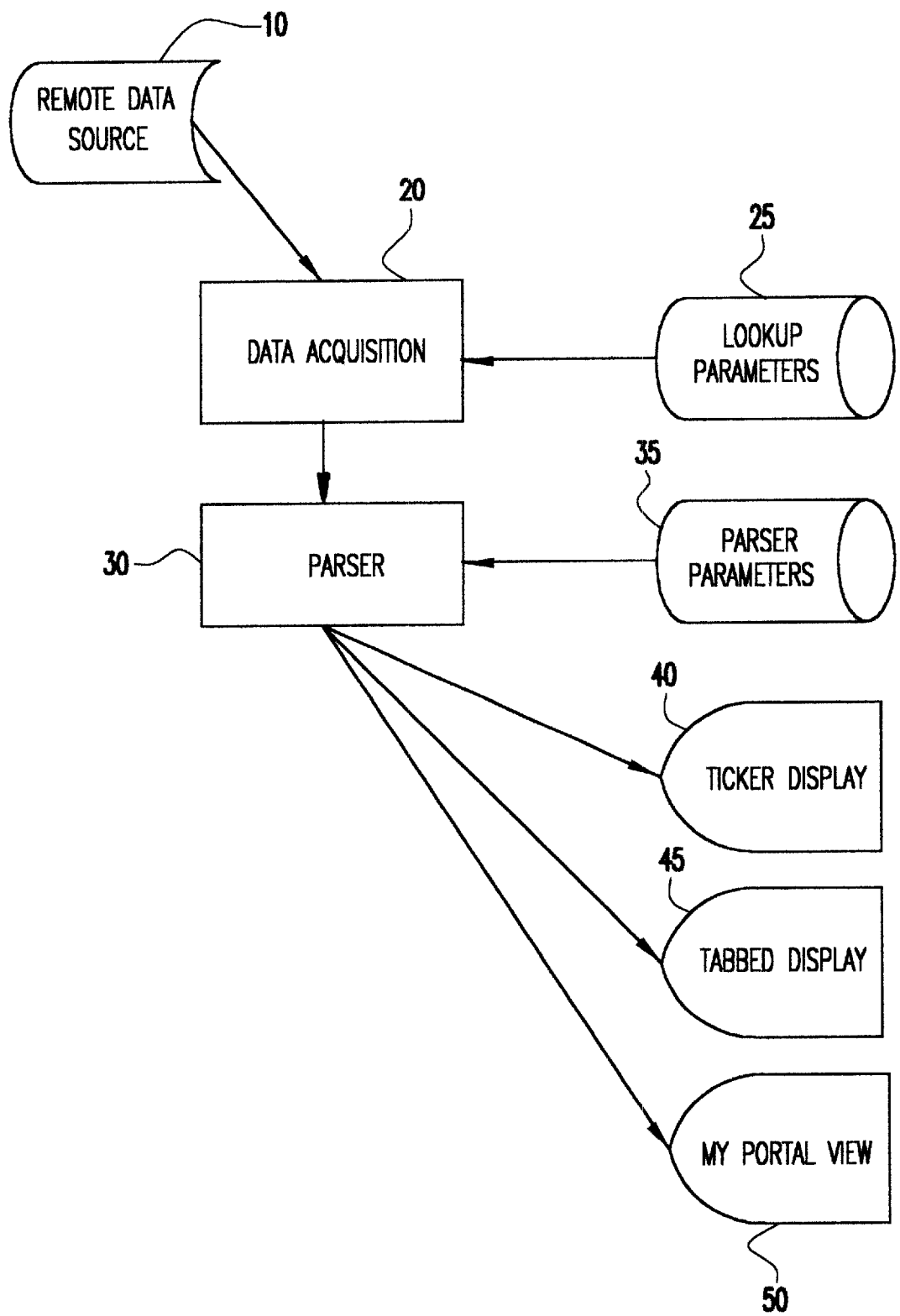
FIG. 1 is a system block diagram of the invention.

The invention comprises the following elements, which may be understood with reference to FIG. 1. First, there is a user definable database of data sources, such as websites, usenet news groups, and the like. Each remote data source 10 has a source-specific data acquisition means 20 (e.g. HTTP for web sources, NNTP for news sources). There may be a source-specific means for computing a portion of the location of the data based on date, time and other lookup parameters 25. Further, the computed portion of the location can include a query for a search engine.

Also, there is a source specific parsing technique 30 for picking out summary information ("headlines") from the source 10. In the case of remote sources using the Hyper Text Transport Protocol (HTTP), for example, the parsing technique 30 can include any subset of constraints included in the inventory of parser parameters 35 available to the configurator which are applicable to HTTP.

A generic parsing technique suitable for all sources of a particular class (e.g. HTTP) is customized for each source (or group of compatible sources) by user selection of constraints which result in the desired summaries for each source (or group of compatible sources). These constraints are maintained in a parser database 35. Users are provided with means to define their own entries into the parser database 35, and to associate these entries with a new data source 10.

The "holy grail" of ticker-like programs is to have the program automatically determine the headline information from a given network site. While it is difficult to anticipate all the ways that headline information may be structured at a site, human readers can identify at a glance the headlines on a page. The fonts, screen position, and other properties make headlines readily visible to the human observer. It may be possible to automatically detect these properties and develop a program to automate what the human observer is able to do by simple inspection. For example, a program could create a specific set of constraints and parser data necessary to identify the headlines, for example, by identifying the largest fonts on the web site, those positioned with some space around them, and/or those arranged in columns.

The invention permits a simpler approach. The invention includes a tool enabling human users by trial and error to select and apply constraints from an inventory to extract headlines from a site. Once selected in this fashion, the constraints can thereafter by applied automatically as parser parameters to update headlines as the content of the site is changed over time. This approach is workable because a site will often maintain the same pattern of attributes for distinguishing headline information even though the specific content changes.

Configurator

A program—the "Configurator"—created in accordance with the invention provides to the user a tool set for taking a user selected collection of remote data sources and interactively specifying a set of constraints for use as parser parameters to identify the headlines for a source or group of sources. These constraints are specified from an inventory of parser parameters, as will be described hereafter. The "Configurator" assists the user in creating a profile—the specific set of site addresses and parser parameters necessary for retrieving summary data from each source or group of sources (e.g. a web site or group of sites). The configurator works on one profile at a time, but can be used to create as many profiles as necessary to produce summaries from all the sites which have been selected by the user.

While the exemplar configurator described hereafter has been implemented specifically for parsing HTML from web sites, the same ideas and techniques can be applied by one skilled in the art to other protocols and data formats.

Figure 2A:
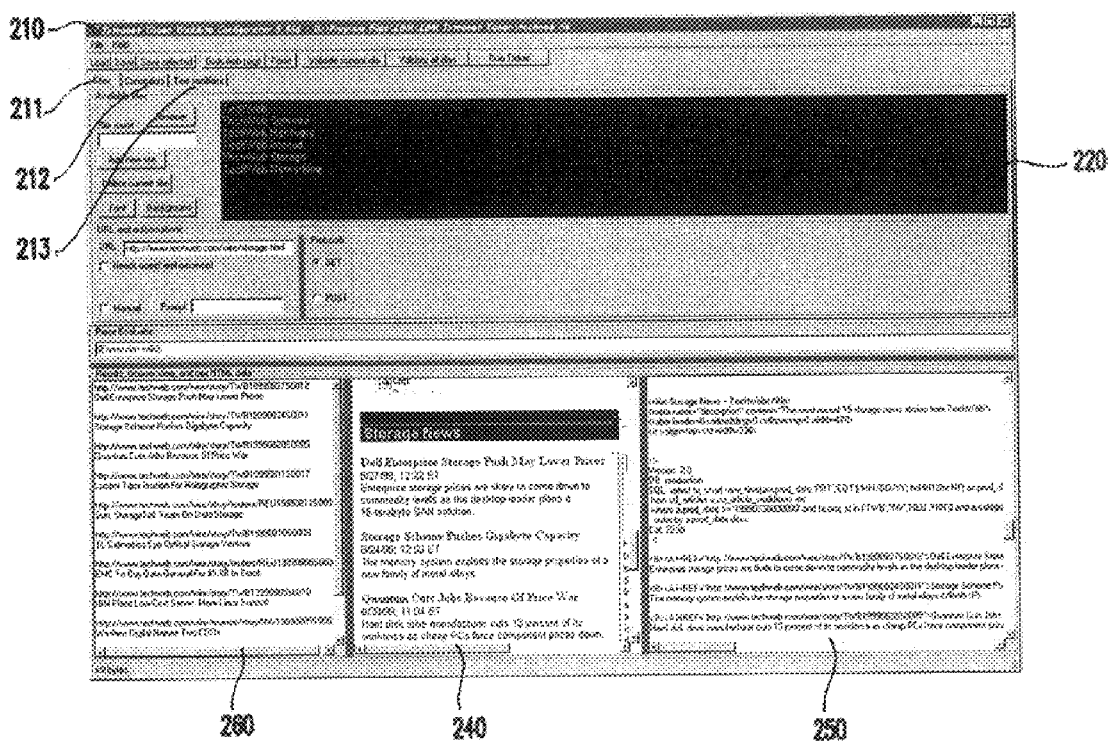
FIGS. 2*a* and 2*b* are computer screen image of a configurator showing component window panes and controls as seen by a user.
Figure 2B:
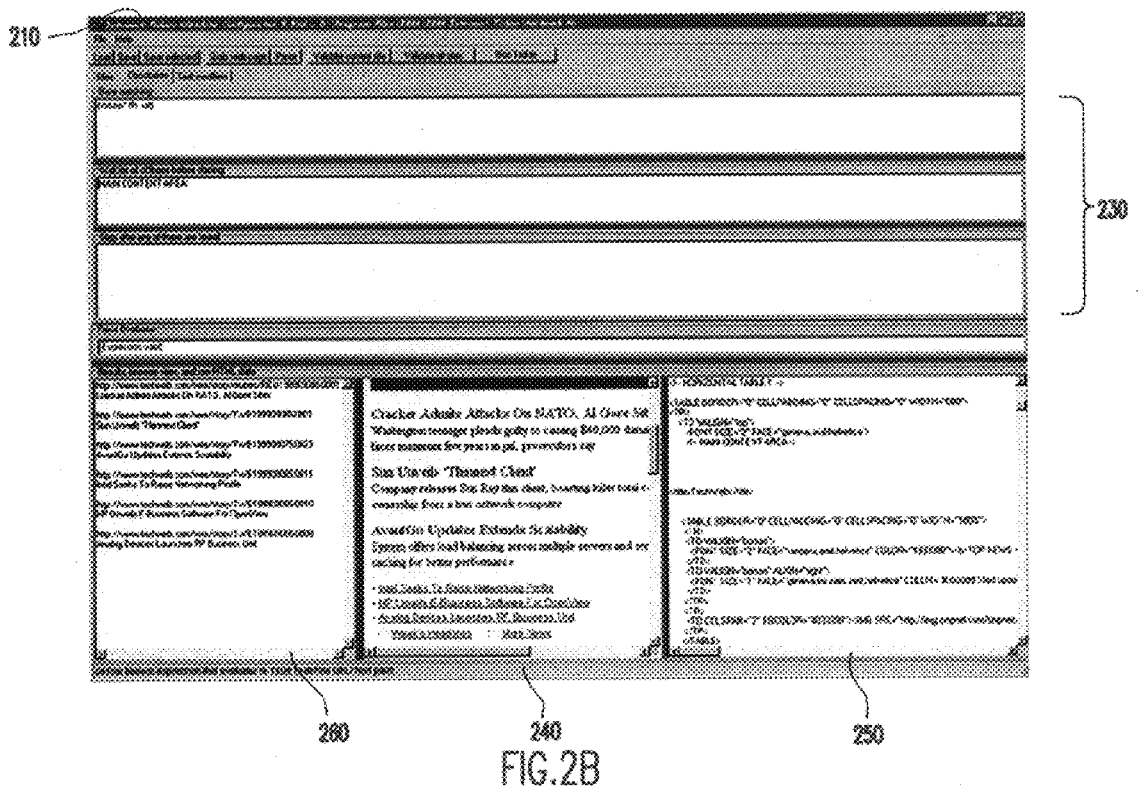

An exemplar configurator for parsing HTML data will now be described with reference to FIGS. 2a and 2b. Typically, a web site selected by the user is one which contains many headlines on it, such as the front page of a news service or other periodical web publication, and the "summary data" pulted from the page is, in fact, the headlines. As shown in FIGS. 2a and 2b, the configurator contains one window 210 with several panes. The top half of the display has separate tabs for "Sites" 211, "Constraints" 212 and "Text Modifiers" 213. The "Sites" tab 211, shown in FIG. 2a, has one pane 220 where the user types the addresses of one or more sites chosen by the user as a remote data source. Under the "Constraints" tab 212 there is a second pane 230 where the program displays and allows the user to edit constraints used as parser parameters to select headlines.

In the lower half of the configurator screen are displayed three additional panes. A pane 240 displays the web site selected on "Sites" tab 211, as it would be viewed in a browser. In pane 250, the program displays the HTML source of the selected web site. In pane 260, the program displays the headlines retrieved from the selected site. To see the effects on a particular site of using the constraints shown under the "Constraints" tab 212 as parser parameters, the user selects that site on the "Sites" tab 211.

When the user selects a web address (URL) in pane 220, the program then displays all hyperlinks with their associated text for the selected site in pane 260. The user can select text in either of the panes 240, 250 or 260 and specify that it be used as data for any of the constraining filters. These filters will reduce the number of hyperlinks shown in pane 260, and the results are immediately reflected in that pane. In this way, the user can interactively experiment with the set of constraints which results in finding the desired set of headline links.

In addition to finding the links to desired material, the program can be configured by the user to identify the appropriate text—that is, the textual summary or "headline" of the article referred to by the hyperlink. Typically, this is the highlighted text associated with the hyperlink, but in some cases the headline comes before or after the hyperlink. The "Constraints" tab 212 in the configurator's window allows the user to specify in pane 230 which text item—before or after the hyperlink—should be used for the headline text.

A database of data sources will contain, for each data source 10, a user-recognizable name (i.e. "The Wall Street Journal Interactive Edition"), the location of the network from which the data can be obtained (i.e. the URL for the web site, or the name of the Usenet news group), and a way of identifying the appropriate data acquisition technique 20 to be used in obtaining the data. This would be any conventional data transfer protocol appropriate for retrieving data from the data source 10. Typically, the data sources will be grouped in "classes" and a data acquisition means 20 will be associated with each class (i.e. web sources will require HTTP; usenet news sources will require NNTP).

The source specific means for computing a portion of the location may be a computer algorithm for computing the a date-specific portion of the URL. For example, a web-site may store articles by including the date of the article in the URL (e.g. the fictitious "Whatever News" site may store a headline at the URL www.whatever.com/headlines/19990704). Thus the parser database for the Whatever News site would have to include a database formula for computing the correct URL, such as www.whatever.com/headlines/YYYYMMDD. Other more complicated examples which may be necessary include algorithms for returning the date corresponding to the most recent Sunday or Monday or the most recent even hour. These algorithms will be useful for sites which organize their headlines by the week, or sites which are updated on an hourly basis, respectively.

Figure 4:
FIG. 4 shows a display of stories from which headlines can be parsed in accordance with the invention.

The source specific parsing technique 30 can be any conventional parsing algorithm, although in a representative embodiment a parsing technique requiring minimal customization on a per-site basis has been devised, and will now be discussed. A representative embodiment accesses pages on the World Wide Web. Typically, these are the front pages of publications which have a set of article headlines and links to full-text versions of the articles. A typical web site article in shown in FIG. 4. As a starting point, the parser uses any text associated with a URL link on the page as a possible summary data item. For any given site a text item preceding or following the actual URL link will be configured as the "associated text" with a URL. Typically, a web page of this sort contains a great many links, only some of which are actually summary data items. Therefore, the parser 30 contains a set of constraining filters which are applied to select a subset of these links. These filters include:

1. Text which must be present anywhere in the URL.
2. Text which must not be present anywhere in the URL.
3. Text which must present at the beginning of the URL.
4. Text which must be present at the end of the URL.
5. Text which must not be present at the beginning of the URL.
6. Text which must not be present at the end of the URL.

For example, in the hypothetical "Whatever News" site, all news articles are stored in a directory called "articles". Therefore, constraint (1) would be used, since all URLs for news articles contain the text "articles". These filters allow constraints on the organization of the web site itself. For any of these constraints, the computational functions presented above can be used to compute a portion of the text used in the constraint.

Some sites are not organized in a manner which facilitates these filters. In such cases, the organization of the "front page" helps identify the actual articles of interest. For example, the news articles may appear only after a particular phrase is used on the web page, i.e. the phrase "Today's Headlines." Also, all URLs after a specific phrase may be safely ignored, i.e. the phrase "Advertisements." So two additional constraints are used to guide the parser:

1. A set of strings which must be encountered before the summary items are considered for collection.
2. A set of strings which, once encountered, will stop the parsing process.

For any of these constraints, the computational functions presented above can be used to compute a portion of the text used in the constraint.

Returning to FIG. 1, the summary information items extracted by parser 30 are then displayed in a user selectable format drawn from those well known in the art. One display format is the ticker display 40, which is shown in FIG. 7. This format is visually similar to the "ticker" used to show transactions at stock exchanges, except that headlines rather than stock transactions are shown. As with a stock ticker, the headlines scroll across the ticker in a two line display. The narrow format of the display makes it convenient for inclusion at the top or bottom of a computer display screen, readily accessible by the user.

Summary information may also be organized into a tabbed display as shown in FIG. 6. The top area of the display 610 shows an array of tab headings. A tab heading may refer to a site (where the headlines under the tab are from a particular site), a key word (where the headlines under the tab are described by the key word), or any other category under which summaries may be organized. It should be noted that the organization of summaries for the purposes of display may or may not be related to particular sites or to the organization of sites into profiles for the purpose of generating summaries. When a particular tab is selected, it is moved to the front of the display (i.e. the bottom row of the array 610). In FIG. 6, the selected tab 620 has the heading "Yahoo Business" and the headlines within that tab are listed in the display area 630 beneath the array 610 of tab headings. As is well known in the art, the array 610 of tab headings can be disposed at the bottom or along the sides of the display.

The "MyPortal" view is a third technique for viewing the summary data. The program can present each of the headlines in a window, organized by data source, and present the whole set of windows to the user. This is shown in FIG. 3. In other words, each "tab" of the "tab view" is displayed as a window 310. The windows are all independently sizable and movable within a larger containing window 320.

In a more advanced form of the "MyPortal" view, the program can generate HTML code which positions headlines on a page in accordance with a user defined organizational structure. This organizational structure for display, as noted earlier, may or may not have any connection to the sites or site profiles used for generating summaries. The result is that the program creates a customized "portal" view, consisting of the headlines selected from the web sites specified by the user. This is far more flexible than the portals at commercial web sites such as excite.com and yahoo.com, as those sites only consist of headlines from specific information resources. Using the invention, a portal-like view can be created using any set of network information sources at all.

In a simple implementation of the "MyPortal" view, the headlines would simply be listed with their associated links in an HTML file and loaded in a browser window. However, in a more elaborate implementation, a tool similar to an HTML editor could be used to customize the positions, locations, fonts and other attributes used to display the summary information, giving maximum flexibility to the user.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for collecting and displaying summary information from disparate sources, comprising:

a user definable database of data sources, each said source being accessible via a protocol and having data acquisition procedures for taking the data into a common format, at least one of said sources having a protocol and data acquisition procedures disparate from the protocol and data acquisition procedures of at least one other source;

data acquisition means for locating each of said data sources, said data acquisition means having lookup parameters configurable by said user into one or more source acquisition profiles; and parsing means for extracting summary information from each of said data sources, said parsing means having parser parameters configurable by said user into one or more parser profiles, each said parser profile being applicable to one or more of said data sources, such that when parser profile is applied to a data source said parser profile extracts said summary information, each said parser profile being configured by a trial-and-error method using immediate display of results of application of said parser parameters to said one or more data sources.

2. A system as in claim 1, further comprising means for displaying said summary information.

3. The system of claim 2, wherein said display means further comprises one or more of scrolling display means, tab display means, or a MyPortal view.

4. The system of claim 3, wherein said MyPortal view displays headlines within each of a plurality of smaller windows within a larger window, at least one of said smaller windows being independently sizable and movable within said larger window.

5. The system of claim 3, wherein said MyPortal view positions headlines on a page in accordance with a user defined organizational structure.

6. The system of claim 5, wherein constraints from an inventory of parser parameters are customized by the user, said constraints being applied to identify headlines for one or more sources.

7. The system of claim 4, wherein said constraints comprise any of:

text which must be present anywhere in a Universal Resource Locator (URL);

text which must not be present anywhere in said URL;

text which must be present at the beginning of said URL;

text which must be present at the end of said URL;

text which must not be present at the beginning of said URL; and text which must not be present at the end of said URL.

8. The system of claim 3, wherein said display means positions headlines on a display in accordance with an organizational structure defined by a user.

9. The system of claim 1, wherein at least one of said data sources contains content which changes over time, and wherein application of said parser profile corresponding to said data source results in extraction of summary information corresponding to said changed content.

10. The system of claim 9, wherein at least one of said lookup parameters is ascertained automatically.

11. The system of claim 9, wherein at least one of said parser parameters is ascertained automatically.

12. The system of claim 1, wherein each said parser profile contains a set of constrain g filters.

13. The system of claim 1, wherein said data acquisition means includes an algorithm for computing dates in a URL.

14. A configurator system comprising:

a parser for extracting summary information from a data source, said parser being operable through application of parser parameters configurable by a user; and a user interface for presenting information from said data source to a user and for enabling said user to configure said parser parameters by selectively applying one or more of said parser parameters to said data source information and by displaying results from said application, wherein said user repeats said selection until satisfied with said displayed results.

15. A configurator system as in claim 14, wherein at least one of said parser parameters is automatically ascertained.

16. A method for collecting and displaying summary information from disparate sources, comprising the steps of:

using lookup parameters to locate data sources, said lookup parameters being configurable by a user into one or more source acquisition profiles; and using parser parameters to extract summary information from each of said data sources, said parser parameters being configurable by said user into one or more parser profiles, each said parser profile being applicable to one or more of said data sources, such that when applied to a data source said parser profile extracts said summary information, each said parser profile being configured by a trial-and-error method using immediate display of results of application of said parser parameters to said one or more data sources.

17. The method of claim 16, further comprising the step of displaying said summary information.

18. The method of claim 17, wherein said displaying step further comprises one or more of the steps of:

scrolling summaries across a ticker display;

presenting summaries behind one or more tabs;

displaying summaries in a MyPortal view.

19. The method of claim 18, wherein said MyPortal view displays headlines within each of a plurality of smaller windows within a larger window, at least one of said smaller windows being independently sizable and movable within said larger window.

20. The method of claim 18, wherein said MyPortal view positions headlines on a page in accordance with a user defined organizational structure.

21. The method of claim 20, wherein constraints from an inventory of parser parameters are customized by the user, said constraints being applied to identify headlines for one or more sources.

22. The method of claim 1, wherein said displaying step further comprises the step of positioning headlines on a display in accordance with an organizational structure defined by a user.

23. The method of claim 16, wherein at least one of said data sources contains content which changes over time, and wherein application of said parser profile corresponding to said data source results in extraction of summary information corresponding to said changed content.

24. The method of claim 23, wherein at least one of said lookup parameters is ascertained automatically.

25. The method of claim 23, wherein at least one of said parser parameters is ascertained automatically.

26. The method of claim 16, wherein each said parser profile contains a set of constraining filters.

27. The method of claim 26, wherein said constraining filters comprise any of:

text which must be present anywhere in a Universal Resource Locator (URL);

text which must not be present anywhere in said URL;

text which must be present at the beginning of said URL;

text which must be present at the end of said URL;

text which must not be present at the beginning of said URL; and text which must not be present at the end of said URL.

28. The method of claim 16, wherein said lookup parameters include an algorithm for computing dates in a URL.

29. A method of presenting summary information, comprising the steps of:

applying parser parameters to extract summary information from a data source, said parser parameters being configurable by a user;

presenting information from said data source to a user;

enabling said user to configure said parser parameters by selectively applying one or more of said parser parameters to said data source information; and displaying results from said selective application, wherein said user repeats said selection and application until satisfied with said displayed results.

30. The method of claim 29, wherein at least one of said parser parameters is automatically ascertained.

* * * * *